United States Patent [19]

Kent et al.

[11] 4,209,413
[45] Jun. 24, 1980

[54] THERMAL ENERGY STORAGE MATERIAL

[75] Inventors: Peter J. C. Kent, High Wycombe; John K. R. Page, Camberley, both of England

[73] Assignee: The Calor Group Limited, England

[21] Appl. No.: 913,351

[22] Filed: Jun. 7, 1978

[30] Foreign Application Priority Data

Jun. 10, 1977 [GB] United Kingdom ............... 24279/77

[51] Int. Cl.² ............................................... C09K 5/06
[52] U.S. Cl. ...................................... 252/70; 126/263; 126/400; 165/104 S
[58] Field of Search ...................... 252/62, 67, 70, 316; 126/263, 400; 62/4; 165/DIG. 4, 53, 104

[56] References Cited

U.S. PATENT DOCUMENTS

| | | | |
|---|---|---|---|
| 2,677,664 | 5/1954 | Telkes | 252/70 |
| 2,827,438 | 3/1958 | Broadley et al. | 252/70 |
| 3,720,198 | 3/1973 | Laing et al. | 126/400 |
| 3,986,969 | 10/1976 | Telkes | 252/70 |
| 4,003,426 | 1/1977 | Best et al. | 126/400 |
| 4,104,185 | 8/1978 | Schröder | 252/70 |
| 4,111,189 | 9/1978 | Dizon | 126/400 |

FOREIGN PATENT DOCUMENTS

| | | | |
|---|---|---|---|
| 763790 | 8/1971 | Belgium | 252/316 |
| 2376893 | 9/1978 | France | 252/70 |
| 45-36572 | 11/1970 | Japan | 252/316 |
| 46-19601 | 6/1971 | Japan | 252/67 |
| 46-28418 | 8/1971 | Japan | 252/316 |
| 51-90989 | 8/1976 | Japan | 252/70 |

Primary Examiner—P. E. Willis, Jr.
Attorney, Agent, or Firm—Jesse B. Grove, Jr.

[57] ABSTRACT

A thermal energy storage material comprising at least one hydrated inorganic salt having a transition temperature to the anhydrous or a less hydrated form in the range 10° to 100° C. (for example, sodium sulphate decahydrate), the salt being dispersed and suspended in a water-insoluble hydrogel formed from a water-soluble synthetic polymer having pendant carboxylic or sulphonic acid groups cross-linked with cations of a polyvalent metal (for example, aluminium or magnesium).

11 Claims, No Drawings

THERMAL ENERGY STORAGE MATERIAL

The present invention is concerned with thermal energy storage materials and heat-exchange devices containing such materials.

Thermal energy storage materials may store thermal energy as specific heat and/or as latent heat. It is often desirable to use materials which store thermal energy as latent heat, since this enables the volume occupied by the storage material to be minimised. This is advantageous, for example, in materials operating in the temperature range 10° C. to 100° C. for the storage of solar energy or of heat extracted during refrigeration.

Materials which are useful for the storage of thermal energy as latent heat undergo reversible transition from one form to another on heating to a characteristic transition temperature. This transition may be from solid phase to liquid phase (fusion) or from one crystal form to another (this latter transition also being referred to as fusion).

A number of hydrated inorganic salts are known which undergo transition to the anhydrous or a less hydrated form at a characteristic temperature on heating and revert to the more hydrated form on cooling.

A potential drawback in the use of many of these hydrated salts is incongruency of the phase transition, that is, the transformation of the low-temperature solid phase to a two-phase condition where a solid and liquid coexist. In the two-phase condition, the difference in densities of the two phases causes segregation thereof, which limits their ability to recombine and form the low-temperature single solid phase. Consequently the amount of heat recoverable on cooling is reduced.

Attempts can be made to avoid the formation of two phases above the transition point by controlling the initial composition of the material, but, even for materials with a congruent phase transition, there remains the problem that the solid phase tends to settle out in time. This limits both the kinetics of transformation and the uniformity of energy storage density within a container, and results in deterioration of the material on repeated heating/cooling cycles.

Thermal energy storage materials have been proposed in which the hydrated inorganic salt is thickened by an organic thickening agent, for example, cellulosic polymers, starch, alginates or an inorganic thickening agent, such as a clay (as disclosed in U.S. Pat. No. 3,986,969). The above-mentioned organic thickening agents are natural polymers (or derivatives thereof) and are therefore unstable to hydrolysis and bacterial and enzyme action, which considerably shortens the use of the material. The above-mentioned inorganic thickening agents are more stable, but it appears that thermal energy storage materials containing such thickening agents can only be used in very shallow depths (for example, about one inch) and must therefore be disposed horizontally.

It is an object of the invention to provide a thermal energy storage material comprising a hydrated inorganic salt which can be used in vertical columns of substantial height.

It is a further object of the invention to provide a thermal energy storage material which is stable to hydrolysis and biological breakdown.

These and other objects are achieved according to the invention by the provision of a thermal energy storage material in which a hydrated inorganic salt having a transition temperature to the anhydrous or a less hydrated form in the range 10° to 100° C. is dispersed in a hydrogel formed from a water-soluble synthetic polymer having pendant carboxylic or sulphonic acid groups cross-linked with cations of a polyvalent metal.

One advantage of the material according to the invention is that the hydrated inorganic salt is immobilized in close proximity in small volumes throughout the gel. This minimises any segregation which could arise, after fusion of the hydrate phase, by any solid sinking to the bottom of the mixture. There is no need to use the material according to the invention in flat horizontal trays; the material can be arranged in vertical columns of substantial height (for example, 50 cm. to one meter).

A further advantage of the material according to the invention is that the cross-linked hydrogel can be prepared in situ by reaction between the respective water-soluble polymer or an alkali metal or ammonium salt thereof and a water-soluble salt of the polyvalent metal.

Suitable polyvalent metals include, for example, chromium, iron, tin, magnesium and aluminium. Aluminium and magnesium are preferred in view of the ready availablility of water-soluble salts thereof. Suitable water-soluble salts of the above metals include, for example, chlorides, nitrates or sulphates, of which aluminium sulphate and magnesium sulphate are preferred. The polyvalent metal is preferably present in an amount sufficient to react with all the acid groups in the polymer to form ionic crosslinks. The actual amount necessary to achieve complete reaction depends on factors such as the valency of the metal, the proportion of acid groups in the polymer and the amount of polymer in the material. Typical amounts of polyvalent metal are 0.5 to 5% (expressed as the weight of water-soluble salt, based on the weight of the storage material).

The water-soluble polymer preferably has a backbone containing units of acrylic acid or methacrylic acid, for example, a homopolymer or copolymer or acrylic acid or methacrylic acid, partially hydrolysed polyacrylamide or polymethacrylamide, or an alkali metal or ammonium salt thereof. In some embodiments, the polymer preferably contains 5 to 50% (for example 10 to 40%) carboxylic groups, the percentages being based on the number of repeating units in the polymer backbone.

The molecular weight of the polymer may vary over a wide range. For some applications it may be advantageous to use polymers of relatively low molecular weight (for example, 100,000 to 500,000), while for other applications, higher molecular weights (for example 1 million to 8 million) may be preferred.

The water-soluble polymer is preferably present in the thermal energy storage material in a relatively minor amount, such as from 0.5 to 10% (for example, about 5%), based on the weight of the material.

Suitable hydrated inorganic salts for use in the material according to the present invention include, for example, calcium chloride hexahydrate (the fusion point of which is 29° C.); sodium sulphate decahydrate (the fusion point of which is 32° C.); disodium hydrogen phosphate dodecahydrate (the fusion point of which is 35.5° C.); sodium thiosulphate pentahydrate (the fusion point of which is 50° C.); sodium acetate trihydrate (the fusion point of which is 58° C.); barium hydroxide octahydrate (the fusion point of which is 75° C.) and zinc nitrate hexahydrate (the fusion point of which is 35° C.).

For the storage of solar energy, the hydrated salt preferably has a fusion point in the range 20° to 90° C. and is preferably non-toxic, non-corrosive and readily available at low cost. Preferred hydrated salts meeting some or all of the above requirements are sodium sulphate decahydrate, disodium hydrogen phosphate dodecahydrate, sodium thiosulphate pentahydrate and sodium carbonate decahydrate.

Some of the above-mentioned hydrated salts, when cooled below the fusion point thereof, tend to undergo supercooling (that is they do not transform back to the hydrated form until the temperature is below the theoretical fusion point). This may result in less hydrated forms of the salt being formed, with consequent reduction in the amount of energy released. In order to avoid supercooling, the material may be nucleated, for example, by a heat-transfer method as disclosed in U.S. Pat. No. 2,677,243, by careful control of the proportions of the ingredients of the composition, or by addition of an insoluble nucleating agent. A preferred nucleating agent for sodium sulphate decahydrate is borax, as proposed in U.S. Pat. No. 2,677,664.

When a nucleating agent is present, this agent, like the inorganic salt, is dispersed and suspended in the hydrogel and effectively immobilized therein. This wide dispersion of immobilized nucleating agent ensures efficient nucleation of the hydrate phase during cooling cycles, thereby inhibiting supercooling.

The thermal energy storage material according to the invention preferably contains the hydrated salt in an amount of from 66% to 95% by weight and, optionally, a nucleating agent in an amount of from 1 to 10%, based on the weight of the hydrated salt.

Substantially all the balance of the thermal energy storage material according to the invention is preferably water and, optionally, an organic liquid which is miscible with water. A particularly preferred such organic liquid is a lower aliphatic alcohol, such as ethanol (for example, when the hydrated salt is sodium sulphate decahydrate). The water is preferably present in an amount sufficient to hydrate all the anhydrous inorganic salt, and is preferably present in a small excess. The material may contain water in an amount of, for example, from 25 to 75% by weight. When a water-miscible organic liquid is included, it is preferably present in a relatively minor amount, compared with water, for example, from 5 to 25%, based on the weight of water.

The material according to the invention is preferably used in a method of heat exchange in which the material is first heated to a temperature above the transition temperature of the hydrated salt, and the heat is extracted from the material by passing a fluid at a temperature below the abovementioned transition temperature in heat-exchange relationship therewith. The alternate heating and cooling of the material can be repeated for many cycles.

The present invention also comprises a heat-exchange device, which comprises a tank containing the thermal energy storage material according to the invention and means for supplying a cooling fluid in heat-exchange relationship with the thermal energy storage material.

In order that the invention may be more fully understood, the following Examples are given by way of illustration only.

EXAMPLE 1

397 gm. of anhydrous sodium sulphate, 10 gm. of solid aluminium sulphate $Al_2(SO_4)_3 14H_2O$, 40 gm. of borax $Na_2B_4O_7 10H_2O$, and 50 gm. of the sodium salt of an acrylamide polymer containing acrylic acid units were thoroughly mixed together while adding 70 ml. of ethanol. The polymer, which had an average molecular weight of about 7.5 million, and had a ratio of carboxyl:amide radicals of about 1:9, was a material commercially available from Allied Colloids Ltd. as WN23.

503 ml. of water was then added while vigorously agitating the mixture at a temperature of approximately 35° C. In a few seconds the mixture gelled to a uniformly thick but smooth consistency of density about 1.4 gm./cm$^3$. This mixture contained no excess of water over that required to completely hydrate all the sodium sulphate present in the final mixture, and on cooling it fully transformed to a solid.

A sample of the solid was sealed in a square section tube measuring 5 cm.×5 cm.×50 cm. long, made of inert plastics. The ends of the tube were sealed by cast epoxy resin plugs.

The tube was disposed vertically and heated to about 60° C. (the heating time being about one hour) and cooled to about 20° C. by heat-exchanging with water circulating outside the tube (the cooling time being three to four hours). Reproducible thermal arrests were obtained for more than 500 cycles of heating and cooling.

EXAMPLE 2

Example 1 was repeated, except that the aluminium sulphate was replaced by the same amount of $MgSO_4.7H_2O$.

In the thermal cycling test, reproducible thermal arrests were obtained for more than 500 cycles.

What is claimed is:

1. In a thermal energy storage material which comprises at least one hydrated inorganic salt having a transition temperature to a less hydrated form in the range 10° to 100° C., the improvement comprising that the inorganic salt hydrate is dispersed and suspended in a water-insoluble hydrogel formed from a water-soluble polymer having pendant acidic groups selected from the group consisting of carboxylic acid and sulphonic acid groups cross-linked with cations of a polyvalent metal.

2. A thermal energy storage material according to claim 1, wherein said polyvalent metal is selected from the group consisting of magnesium and aluminum.

3. A thermal energy storage material according to claim 1, wherein said polymer has a backbone containing units of acrylic acid.

4. A thermal energy storage material according to claim 1, wherein said water-insoluble hydrogel is formed in situ by reaction between a water-soluble salt of said polyvalent metal and an alkali metal salt of said water-soluble polymer.

5. A thermal energy storage material comprising at least one hydrated inorganic salt selected from the group consisting of sodium sulphate decahydrate, disodium hydrogen phosphate dodecahydrate, sodium thiosulphate pentahydrate and sodium carbonate decahydrate, wherein said inorganic salt hydrate is dispersed and suspended in a water-insoluble, ionically cross-linked hydrogel which is a salt of a polyvalent metal and a water-soluble polymer having pendant acidic groups.

6. A thermal energy storage material according to claim 5, wherein said polyvalent metal is selected from the group consisting of magnesium and aluminum.

7. A thermal energy storage material according to claim 5, wherein said polymer contains acrylamide repeating units and acrylic acid repeating units.

8. A thermal energy storage material according to claim 5, wherein said water-insoluble salt is formed in situ by reaction between a water-soluble salt of said polyvalent metal and an alkali metal salt of said water-soluble polymer.

9. A thermal energy storage material in accordance with claim 5 wherein the water soluble polymer is selected from the group consisting of water soluble:
   homopolymers of acrylic acid,
   copolymers of acrylic acid,
   homopolymers of methacrylic acid,
   copolymers of methacrylic acid,
   partially hydrolyzed polyacrylamide,
   partially hydrolyzed polymethacrylamide, and
   alkali metal and ammonium salts thereof,
said polymer having pendant acidic groups, and the polyvalent metal is a member selected from the group consisting of chromium, iron, tin, magnesium, and aluminum.

10. In a method of extracting heat from a thermal energy storage material comprising sodium sulphate decahydrate and a minor amount of borax by passing a fluid in heat-exchange relationship with said material, the fluid being at a temperature below 32° C., the improvement comprising that the sodium sulphate decahydrate is dispersed and suspended in a water-insoluble hydrogel formed from a water-soluble polymer having pendant carboxylic groups cross-linked with cations of a polyvalent metal.

11. A method in accordance with claim 10 wherein the water soluble polymer is selected from the group consisting of water soluble:
   homopolymers of acrylic acid,
   copolymers of acrylic acid,
   homopolymers of methacrylic acid,
   copolymers of methacrylic acid,
   partially hydrolyzed polyacrylamide,
   partially hydrolyzed polymethacrylamide, and
   alkali metal and ammonium salts thereof,
said polymer having pendant carboxylic groups, and the polyvalent metal is a member of the group consisting of chromium, iron, tin, magnesium, and aluminum.

* * * * *